(12) United States Patent
Kulas

(10) Patent No.: US 9,551,859 B2
(45) Date of Patent: Jan. 24, 2017

(54) CLOSE-UP OPTICAL SCANNING FOR A PORTABLE DEVICE

(71) Applicant: Charles J. Kulas, San Francisco, CA (US)

(72) Inventor: Charles J. Kulas, San Francisco, CA (US)

( * ) Notice: Subject to any disclaimer, the term of this patent is extended or adjusted under 35 U.S.C. 154(b) by 0 days.

(21) Appl. No.: 13/906,217

(22) Filed: May 30, 2013

(65) Prior Publication Data

US 2014/0355131 A1    Dec. 4, 2014

(51) Int. Cl.
*G02B 7/02* (2006.01)
*G02B 15/22* (2006.01)
*G02B 7/105* (2006.01)
*G02B 15/10* (2006.01)

(52) U.S. Cl.
CPC ............... *G02B 15/22* (2013.01); *G02B 7/02* (2013.01); *G02B 7/105* (2013.01); *G02B 15/10* (2013.01)

(58) Field of Classification Search
CPC ............ G02B 7/02; G02B 7/105; G02B 15/22
USPC ............... 359/693, 705, 819; 312/223.1
See application file for complete search history.

(56) References Cited

U.S. PATENT DOCUMENTS

2012/0307381 A1* 12/2012 Hsu ............... G02B 13/0085
                                                 359/705
2014/0217862 A1*  8/2014 Rayner ............... 312/223.1

* cited by examiner

*Primary Examiner* — William Choi

(57) ABSTRACT

Embodiments provide an apparatus for allowing close-focus of a camera on a portable electronic device while sliding the device on a surface. A macro lens is selectively placed by a user adjacent to a lens of the camera. Support points maintain the macro lens at a predetermined distance from the surface while the device is slid on the surface.

12 Claims, 3 Drawing Sheets

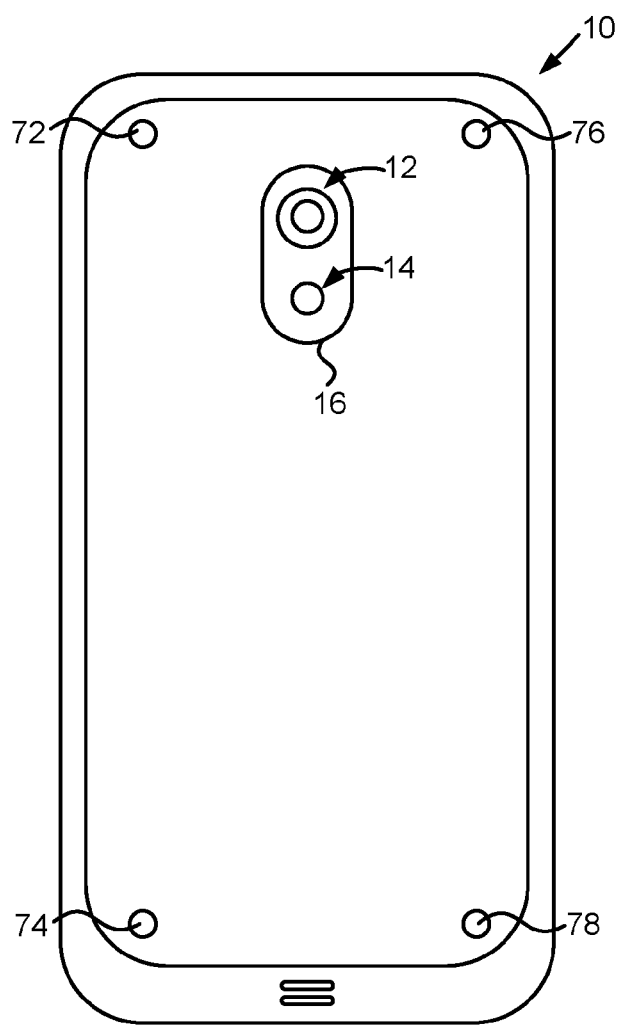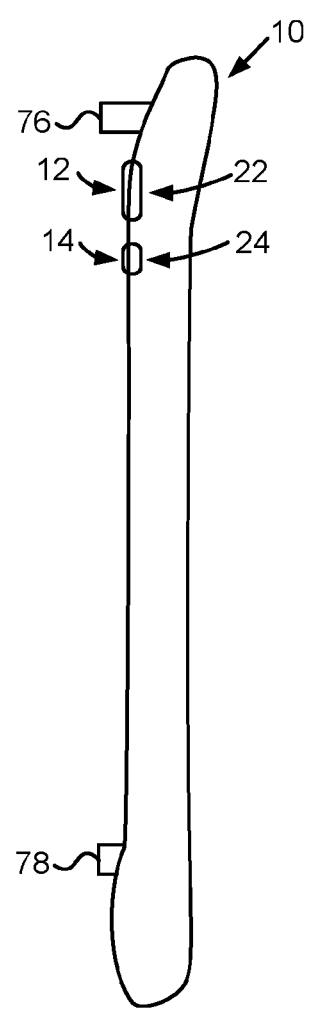
*Figure 2*        *Figure 3*

CLOSE-UP OPTICAL SCANNING FOR A PORTABLE DEVICE

BACKGROUND

Embodiments of the invention relate generally to portable devices and more specifically a portable device having the ability to optically focus and scan with a camera at a close distance.

SUMMARY

Embodiments of the invention provide Embodiments provide an apparatus for allowing close-focus of a camera on a portable electronic device while sliding the device on a surface. A macro lens is selectively placed by a user adjacent to a lens of the camera. Support points maintain the macro lens at a predetermined distance from the surface while the device is slid on the surface. A light source can be used to illuminate the surface. The light source can be the device's own light source or an external light source can be provided.

BRIEF DESCRIPTION OF THE DRAWINGS

FIG. 2 shows a back view of a mobile phone;

FIG. 3 shows a side view of a mobile phone; and

DETAILED DESCRIPTION OF EMBODIMENTS

Figure 1:
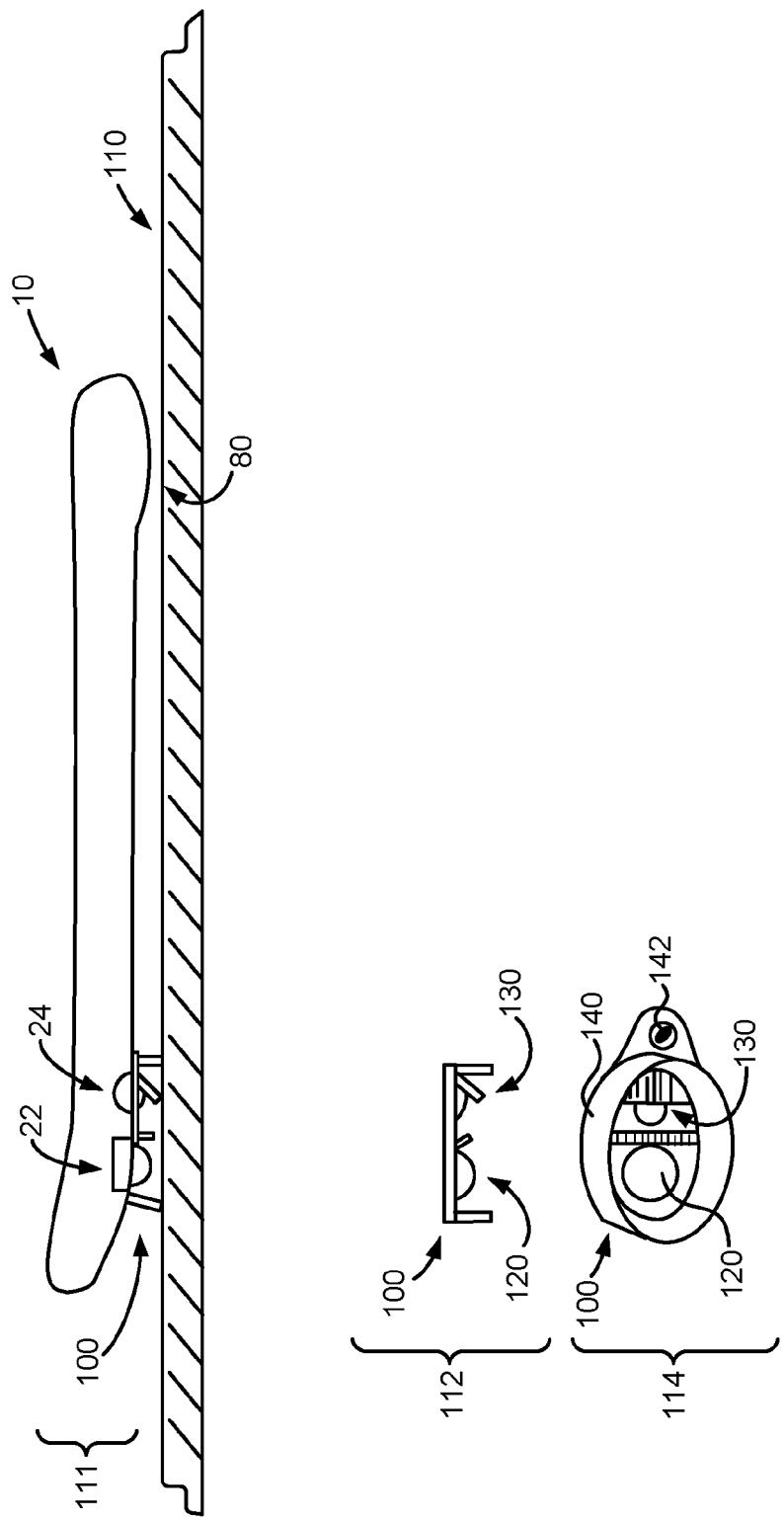
FIG. 1 illustrates a lens assembly adjacent to a phone and surface according to a particular embodiment.

FIGS. 2 and 3 show back and side views, respectively of a mobile phone. Although specific examples of devices such as mobile phones may be used for illustration, embodiments of various aspects of the invention may be suitable for use with many other devices such as tablets, game devices, music or audio players, cameras, etc. The designs and capabilities of a device may vary greatly from those discussed in the specific examples, herein.

In FIG. 2, mobile phone 10 has a rear-facing camera lens 12 and light lens, or flash, 14. The camera and flash lenses are sometimes offset or distinguished from the rest of the phone's housing by having a design or shape around them such as oval 16. In many phone designs this border around the camera and flash lenses is flush with the surrounding body of the phone.

FIG. 3 shows mobile phone 10 of FIG. 2 in a side view. Typically, the camera and/or flash lens may extend very slightly from the phone's body. This side view shows camera lens 12 and flash lens 14 extending slightly and also indicates that the lens components and associated parts extend into the body of the phone as shown by lines at 22 and 24. Typically, these lines and the components they represent are not visible to the eye as they are within the opaque housing of the phone's body. Lens and associated component configurations can differ among devices. For example, although the camera and flash lenses are placed vertically adjacent, other devices may have the lenses placed horizontally adjacent, or at different relative angles and positions. It is possible that there may be more than one of each of the camera and flash lenses. The lenses may be placed at other points on the devices (e.g., front, sides, etc.). The lenses may be concentric with each other as in a design where the flash lens surrounds a camera lens. In some cases, a flash or flash lens may not be provided. Lenses may be of different shapes and sizes and may protrude from the device body to different extents. In some cases, particularly with a flash, a lens may not be used and a simple clear cover or opening may be used, instead. Many variations are possible.

Devices, such as mobile phones, come in many different shapes. Although most are roughly rectangular, many have subtle variations in their shape. In FIG. 3, mobile phone 10 has a convex back 32 and a slightly concave front 34. Embodiments of the invention can be adapted for use with any suitable lens arrangement and type. Any type of device body shape may be accommodated, also.

FIG. 1 illustrates an embodiment of the invention. In FIG. 1, mobile phone 10 (or another suitable device) is place on surface 110. Surface 110 may be a tabletop, workbench, board, floor, wall, car, boat, road, carpet, fabric, etc., or any other solid or somewhat firm surface. Lens assembly 100 is shown between mobile phone 10 and surface 110. In a particular embodiment, lens assembly 100 is secured to the phone so that a close-up (e.g., "macro") camera lens 120 and light channel 130 are placed over the phone's integrated camera and flash, respectively, illustrated in view 112 in FIG. 1.

View 114 in FIG. 1 shows a perspective view of lens assembly 100. In the cross-sectional views 111 and 112 of FIG. 1 are cut-away to show the inside components. In view 114, shroud 140 can be seen encircling the macro camera lens 120 and light channel 130. Shroud 140 may have different dimensions and shapes in other embodiments. In a particular application, mobile phone 10 can be slid across on surface 110 and the edges of the shroud come into contact with and are scraped against the surface as the mobile phone is slid along. The shroud serves both to protect the original camera lens 12 and flash lens 14, and to protect the various components of lens assembly 100. The shroud also serves to keep the surface at a known distance from macro camera lens 120. As is known in the art, by using a macro lens at a known distance from the surface, close-up and in-focus images of the surface can be captured. The light channel allows the existing flash system in the device to be used to illuminate the surface within the area of the shroud. In this manner, the device can be used as an accurate optical mouse or surface scanner so that the sliding distance and rotation with respect to the surface can be accurately determined by using the captured images and image processing techniques.

Note that other embodiments may not need a light source, or may not need to use the device's own light source or camera. For example, shroud 140 need not be solid all the way around and can have considerable gaps or holes through which to let in light. Or a separate light source can be supplied with the lens assembly. Other variations are possible.

Pivot point 142 is used to secure lens assembly 100 to the body of a device such as mobile phone 10. In one embodiment, this allows the lens assembly to pivot over, or away from, the device's own camera. This approach allows the macro lens to be used, as desired, and the device's own lens and light system can also be used when the lens assembly is swung away. In other embodiments, the lens assembly can be made to slide into place over the device's camera and/or flash. Or the lens assembly can be made removable or selectable in other ways such as by allowing the lens assembly to be affixed over or on top of the device's lens as by using an adhesive, velcro, mechanical fasteners, etc. Since many devices have removable back covers the lens assembly can be integrated into a replaceable back cover and the user can choose whether or not to use a standard back cover or one with an integrated lens assembly. Still another embodiment allows all or part of a lens assembly to be provided in a cover or backing that fits around the device or is otherwise secured to the device. Other approaches are possible.

In a particular embodiment, as the device is slid about on the surface, the camera images are collected. One or more processors located within the device are used to process the image data and determine the extent and direction of movement of the device. In this manner, applications that are dependent upon the movement of the device can use the movement information. For example, an application that can measure distance can use the position and movement information. Templates loaded into the device can direct the user how to move the device to draw letters for educational purposes, and can check that the user made the correct movements. Games can use the position information for allowing two or more devices to interact with each other. Many possibilities exist for using the position and movement information. Processing of the device's position and/or movement can also be done by processors external to the device in whole or in part. In such a case, the image data, or portions of the image data, can be sent over a data link to the external processors.

Figure 4:
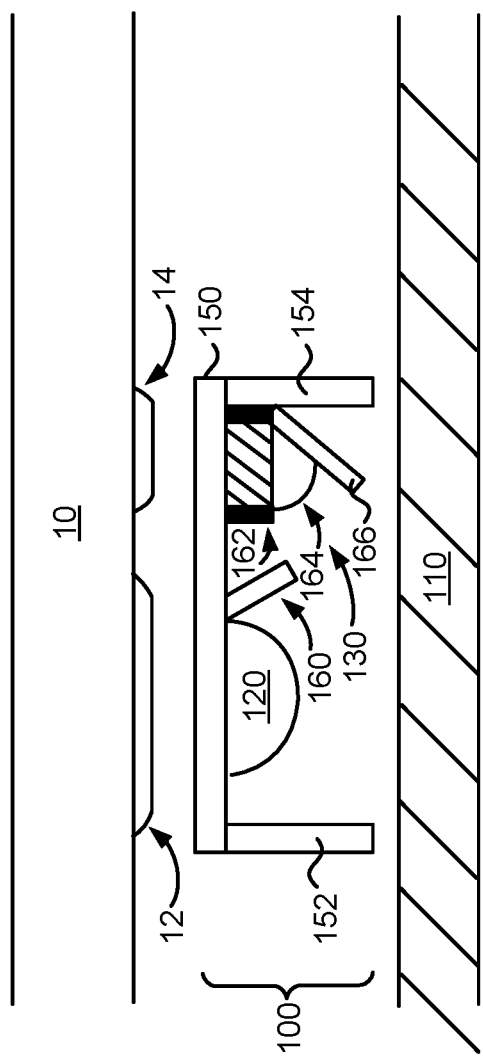
FIG. 4 shows an enlarged view of a lens assembly.

FIG. 4 shows an enlarged view of lens assembly 100. In FIG. 4, lens assembly 100 is suspended between mobile phone 10 and surface 110. Various embodiments can allow the lens assembly to be in contact with one, both or none of these surfaces. As shown in FIG. 4, camera lens 12 and flash lens 14 are on mobile phone 10. Lens assembly 100 has a base 150 and shroud edges 152 and 154. Base 150 keeps macro lens 120 and light channel 130 aligned with camera lens 12 and flash lens 14, respectively. Macro lens 120 is provided with a mask 160 to prevent unwanted light from the flash and/or light channel 130 from directly impinging on the macro lens.

Light channel 130 includes a pedestal 162, lens 164 and reflector 166. These light channel components help to channel the light from flash lens 14 toward the surface that is being viewed by the camera through macro lens 120. The flash light source need not be used as a flash—that is it need not be used for brief, instantaneous moments of illumination—but is more advantageously used in a lower intensity level, and turned on for relatively longer periods of time. Alternatively, if the light source is used in a flash manner, then the light duration can be extended by light channel 130 such as by providing luminescent or phosphorescent effects to capture the light energy and release it over a longer period of time. Other approaches are possible.

In other embodiments, all the parts shown in FIG. 4 may not be necessary. Additional parts can be used and the shapes and dimensions of the illustrated parts can vary, as desired. For example, mask 160 may not be needed. Similarly, the light channel can vary so that different components may be used. Or the light channel can be omitted as where no modification to the device's native light source are needed, ambient light is used, or a separate light source is provided, etc.

Referring again to FIG. 1, the shape of mobile phone 10 and lens assembly 100 allows the lenses to be approximately parallel with the plane of surface 110. The phone rests on its housing at point 80 and the other points of contact are provided by housing 140. In other embodiments, the particular shape of the device and the location of the device's camera and/or light source may determine how the device is supported while sliding.

For example, another approach is not to use support points at various places on the phone's body. These are shown, for example, in FIGS. 2 and 3 at 72, 74, 76 and 78. These support posts, or other support geometry, can be used as substitutes for, or in concert with, support points on the device itself. One advantage of using such support points is that ambient light in the room can be used to sufficiently illuminate the surface so that additional light lenses, channels, control, etc. need not be provided. The support points can be integrated onto a replaceable back for the device. Or the support points can be integrated onto a holder or backing that fits around or onto the device. Other approaches for securing support points to a device may be used.

Naturally the focus point of the camera and macro lens should be at or near the surface position as determined by the support points (e.g., the shroud if used). In some embodiments, the device may have a camera that can focus sufficiently close so that the lens assembly may not be needed. In this case it may be enough just to provide support points for sliding the device on a surface to keep the device at a known, or at least relatively uniform, distance from the surface. In a particular embodiment the distance to surface is in the range 3 to 20 mm. However, any suitable distance can be used.

Although particular embodiments have been described, many variations are possible. Larger devices that may be adaptable for use with features described herein even though the devices may be considered too large for easy "handheld" or "portable" operation. For example, tablet or slate computers such as the iPad™ by Apple Computer, Inc. can be used even though these devices are significantly larger than cell phones.

Any suitable programming language can be used to implement the routines of particular embodiments including C, C++, Java, assembly language, etc. Different programming techniques can be employed such as procedural or object oriented, scripts, interpreted or compiled code, etc. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. An apparatus for allowing close-focus of a camera on a portable electronic device while sliding the device on a surface, the apparatus comprising:
    a movable macro lens that can be selectively placed by a user adjacent to an opening of the camera; and
    one or more support points to maintain the macro lens at a predetermined distance greater than zero from the surface so that the camera can maintain focus on the surface while the device is slid on the surface.

2. The apparatus of claim 1, further comprising the one or more support points including one or more support posts.

3. The apparatus of claim 1, further comprising the one or more support points including a shroud.

4. The apparatus of claim 1, wherein the predetermined distance from the surface is in the range from 3 mm to 20 mm.

5. The apparatus of claim 1, further comprising:
    a light channel formed to direct light from a light source on the device to illuminate at least a portion of the surface.

6. The apparatus of claim 5, wherein the light source includes:
    a camera flash.

7. The apparatus of claim 5, the light channel including:
    a lens.

8. The apparatus of claim 5, the light channel including:
    a pedestal.

9. The apparatus of claim 5, the light channel including:
    a reflector.

10. The apparatus of claim 1, wherein the movable macro lens includes:
    means for sliding the macro lens.

11. The apparatus of claim 1, wherein the movable macro lens includes:
    means for pivoting the macro lens.

12. The apparatus of claim 1, wherein the movable macro lens is removable from the device.

* * * * *